United States Patent [19]
Hepford et al.

[11] 3,940,529
[45] Feb. 24, 1976

[54] NON-NESTED TWO-PLY ABSORBENT FIBROUS SHEET MATERIAL

[75] Inventors: Richard R. Hepford, Folcroft, Pa.; Clifford J. Roberts, Jr., Turnersville, N.J.

[73] Assignee: Scott Paper Company, Philadelphia, Pa.

[22] Filed: July 5, 1973

[21] Appl. No.: 376,383

[52] U.S. Cl. ............... 428/178; 156/210; 162/112; 162/117; 428/180; 428/184
[51] Int. Cl.² ...................... B32B 3/00; B32B 3/28
[58] Field of Search ........... 161/125, 127, 130, 131, 161/135; 156/209, 210; 162/112, 117; 428/178, 174, 184, 166, 136

[56] References Cited
UNITED STATES PATENTS

| | | | |
|---|---|---|---|
| 3,414,459 | 12/1968 | Wells | 161/131 |
| 3,556,907 | 1/1971 | Nystrand | 161/127 |
| 3,708,366 | 1/1973 | Donnelly | 161/127 |
| 3,738,905 | 6/1973 | Thomas | 156/210 |
| R27,453 | 8/1972 | Schutte et al. | 162/117 |

*Primary Examiner*—George F. Lesmes
*Assistant Examiner*—Paul Thibodeau
*Attorney, Agent, or Firm*—R. Duke Vickrey; William J. Foley

[57] ABSTRACT

Disclosed is a non-nested, two-ply, absorbent fibrous sheet material consisting of two webs which each have a plurality of crests and depressions on its surface facing the other web. The crests on each web are positioned between the crests of the other web and are spaced from the depressions of the other web to leave spaces in the sheet material for increased absorbency and bulk. The two webs are joined together at locations intermediate the crests and depressions of at least one of the webs, preferably by mechanical welding in a manner which produces perforations in the sheet material. Also disclosed is the method and apparatus for making the two-ply sheet material.

10 Claims, 4 Drawing Figures

3,940,529

NON-NESTED TWO-PLY ABSORBENT FIBROUS SHEET MATERIAL

BACKGROUND OF THE INVENTION

1. Field of the Invention

The invention relates to an absorbent fibrous sheet material made from two or more webs plied together and to a method and apparatus for forming it. Such webs are preferably made from papermaking fibers by conventional papermaking techniques and are useful for sanitary paper products such as towels and other wiper products.

2. Brief Description of the Prior Art

A strong trend exists in the paper industry to develop disposable products from papermaking fibers to serve as substitutes for conventional cloth products which are used as wipers and towels in both the home and industrial shops. To successfully gain consumer acceptance of these paper products, they must closely simulate cloth in both consumer perception and in performance. Thus, certain physical properties must be present in a successful product. Among these properties are softness, strength, stretchability, absorbency, ability to wipe dry, and bulk. Bulk is particularly important not only because it enables the paper product to feel like cloth, but also because it favorably interrelates with other desirable properties, such as softness and absorbency. And, of course, absorbency is very important where the product is to be used to wipe up spills.

Probably the most commonly employed method to produce a wiperlike paper product having the desirable bulk and absorbency is to laminate two or more embossed conventional paper webs together. One such method which has been found particularly advantageous is disclosed in U.S. Pat. No. Re 27,453. The "27,453 method" employs a pair of meshed embossing rolls which mechanically work two webs passed through the nip formed by the two rolls to produce crests and depressions in the webs and join them together by mechanical working of the webs at locations intermediate the crests and depressions. The "27,453 method" offers many advantages, one of which is an efficient web joining process due to the web working being performed on the sides of the embossing knuckles and involving shearing action in addition to compression against the webs. Another advantage is that the shearing action can be employed to perforate the webs and thus increase stretch and softness due to flexibility of the product. One disadvantage in the "27,453 method" is that the two webs are nested together as a result of being embossed together without spaces between the two webs. The addition of spaces between two webs would be beneficial because it creates additional bulk and absorbency in the product, as well as increased softness due to compressibility.

There are methods of laminating two or more webs together which avoid nesting the two webs together. In those methods, the two webs are embossed separately to produce crests and depressions on the webs and then brought together after applying adhesive to the crests on at least one of the webs. The two webs are joined together in a non-nested manner, which provides spaces between the two webs to increase the absorbency and bulk of the product.

In one such example of the prior art, disclosed in U.S. Pat. No. 3,414,459, the crests of each web on the sides facing each other are joined together with an adhesive. In another example of the prior art, disclosed in U.S. Pat. No. 3,556,907, the embossed configuration of each web is different from the other web, and the crests on one web are joined with adhesive to the depressions of the other web. In yet another example of the prior art, disclosed in U.S. Pat. No. 3,708,366, the height of the crests of the first web is greater than the height of the crests on the second web, and the higher crests on the first web are joined with adhesive to the depressions on the second web.

All of the prior art examples of two-ply laminated webs where the webs are embossed before being joined together generally require the use of adhesive, which results in a harsher product, a more complex process, and additional expense. There is some suggestion in the prior art that the webs can be joined by the application of moisture and pressure to the webs at their crests to compress the webs together, but such pressure would have to be excessive to provide satisfactory joining strength, if even possible. On the other hand, the "27,453 method", while avoiding the described disadvantages of the other plying methods, does not create the amount of bulk and absorbency in the product which can be created in the non-nested products. Practice of the present invention combines the advantages of the joining technique and increased stretch and softness due to flexibility of the "27,453 method" with the increased bulk and absorbency and softness due to compressibility of the non-nested two-ply prior art methods.

SUMMARY OF THE INVENTION

The invention is a two-ply, non-nested, fibrous sheet material made preferably from papermaking fibers and which consists of two webs joined together with inner surfaces facing each other. Each web has a plurality of crests and depressions on its inner surface. The crests on each web are positioned between the crests on the other web and extend beyond the crests of the other web toward but spaced from the depressions on the other web to form spaces between the two webs. The two webs are connected to each other at locations intermediate the crests and depressions on at least one of the webs, and preferably on both. In the preferred embodiment the webs are connected to each other by mechanically welding in a manner which perforates the webs at the joining locations. The perforations permit additional stretch in the sheet material, and by controlling the alignment of the perforations, stretch can be increased in web directions such as the cross-machine direction where most paper webs have little stretch.

The invention also consists of a method for forming the above-described two-ply sheet material by the steps of separately embossing each of the two webs to form a plurality of crests and depressions on the inner side of each web, bringing the two webs together to position the crests on the inner side of each web between the crests on the inner side of the other web with the crests on each web extending beyond the crests on the other web toward but spaced from the depressions on the other web, and connecting the two webs to each other at locations intermediate the crests and depressions on at least one of the webs, and preferably on both. In the preferred method, the webs are connected to each other by mechanical welding in a manner which creates perforations in the sheet material at the locations where the webs connect to each other.

The invention also consists of an apparatus for performing the above-described method and which consists of two rotatably mounted embossing rolls, each having outwardly extending embossing knuckles and at least one of the embossing rolls having outwardly tapering knuckles. The embossing rolls are positioned with respect to each other to cause contact of successive embossing knuckles of one of the embossing rolls with successive embossing knuckles of the other embossing roll at locations along the sides of the embossing knuckles. The embossing rolls are further arranged with respect to each other to maintain a space between the top of each knuckle and the base of the knuckles meshed with it on the other embossing roll. The apparatus further includes an elastomer covered press roll in nipping relationship with each of the embossing rolls for pressing a web against each embossing roll to contour the web to the knuckle configuration of that embossing roll.

DETAILED DESCRIPTION OF THE PREFERRED EMBODIMENTS

Figure 1:
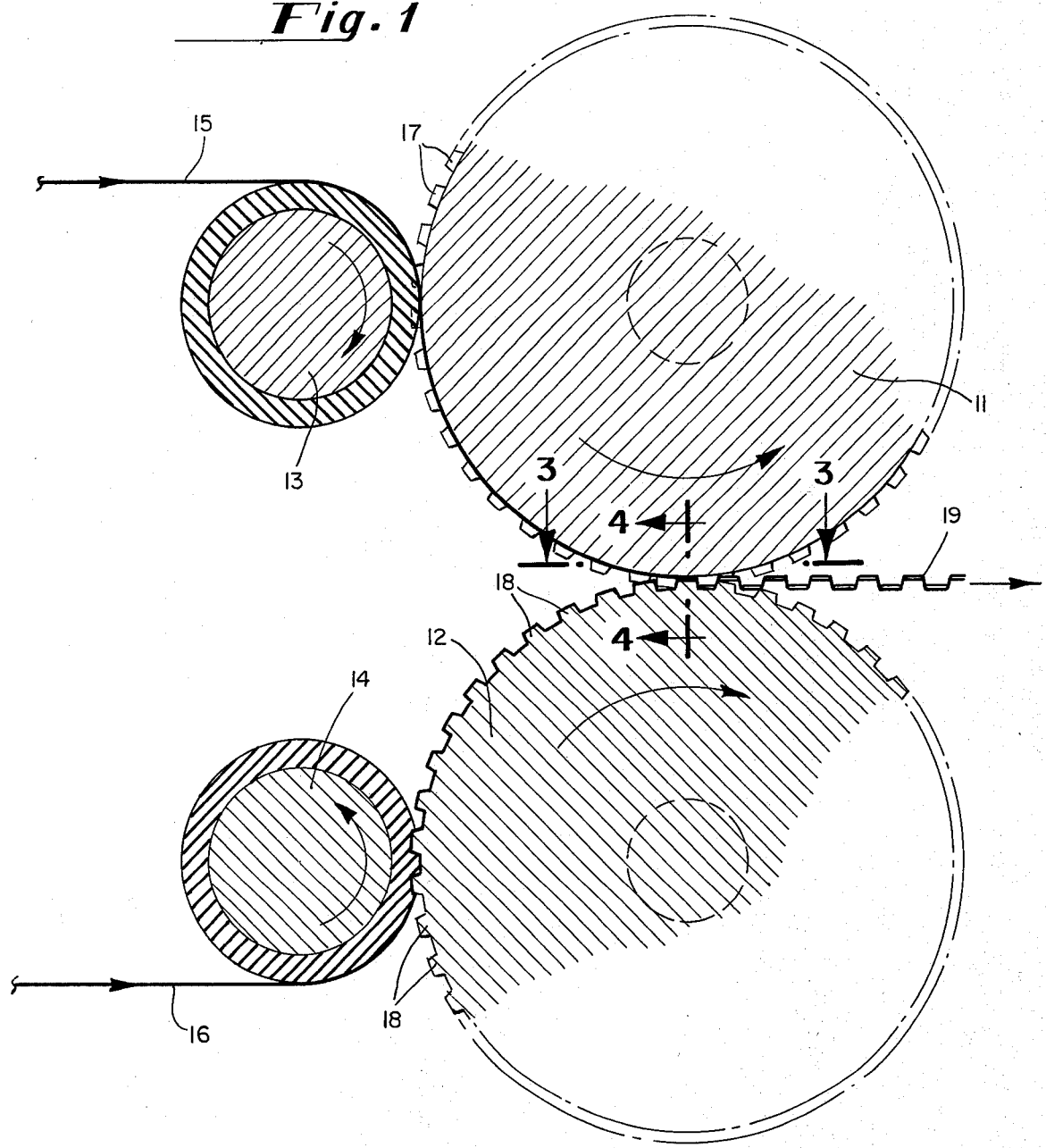
FIG. 1 is a schematic elevation view of the apparatus of the invention producing the product of the invention.

FIG. 1 illustrates the apparatus of the invention. It consists of upper embossing roll 11, lower embossing roll 12, upper press roll 13 and lower press roll 14, each rotatably mounted and driven by conventional means not shown. Each of the press rolls are in nipping relationship with its respective embossing roll. The embossing rolls 11 and 12 have embossing knuckles 17 and 18 extending outwardly from their circular periphery, and the press rolls 13 and 14 each have an elastomer cylindrical cover. The embossing rolls 11 and 12 are positioned with respect to each other through gears or other conventional means not shown to mesh knuckles 17 on upper embossing roll 11 with knuckles 18 on lower embossing roll 12.

Figure 3:
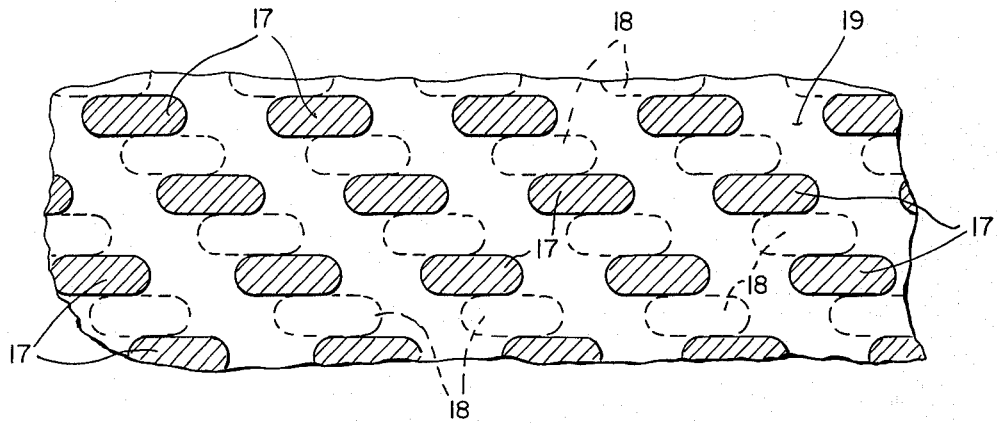
FIG. 3 is an enlarged sectional plan view taken along line 3—3 of FIG. 1.
Figure 4:
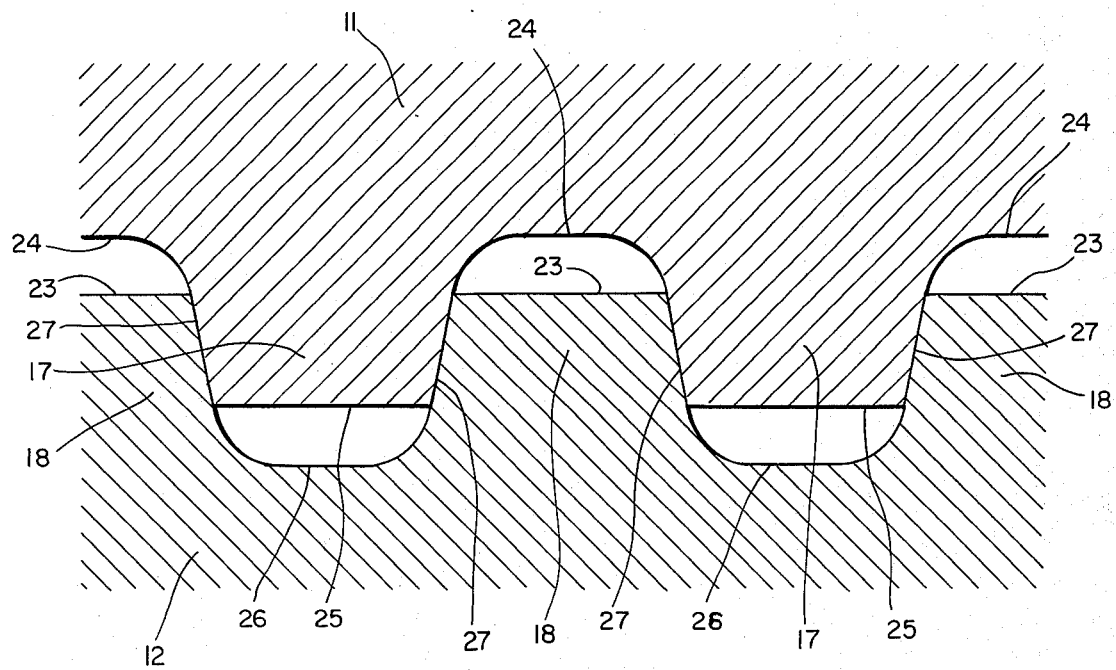
FIG. 4 is an enlarged sectional elevation view of the apparatus of the invention taken along line 4—4 of FIG. 1 (the webs are not shown).

A first fibrous web 15 is shown passing through the nip formed by upper embossing roll 11 and upper press roll 13 where the web is pressed against and conformed to the configuration of the knuckles 17. The web 15 then continues in rotation with upper embossing roll 11 to the nip formed by the two embossing rolls 11 and 12. A second fibrous web 16 is passed through the nip formed by lower embossing roll 12 and lower press roll 14 where it is pressed against and conformed to the configuration of the knuckles 18. The fibrous web 16 then continues in rotation with lower embossing roll 12 to the nip formed by the two embossing rolls 11 and 12. At the nip formed by the embossing rolls 11 and 12, knuckles 17 and 18 are positioned with respect to each other to mesh as illustrated in FIGS. 3 and 4, where they are illustrated contacting each other at locations on their sides between their crests and depressions. The contact between knuckles 17 and 18 is made with sufficient force to mechanically work the two webs 15 and 16 together and join them. The two webs 15 and 16 are joined together by the intermeshing knuckles into a two-ply sheet material 19, and pulled from the embossing rolls 11 and 12 by conventional means not illustrated.

Figure 2:
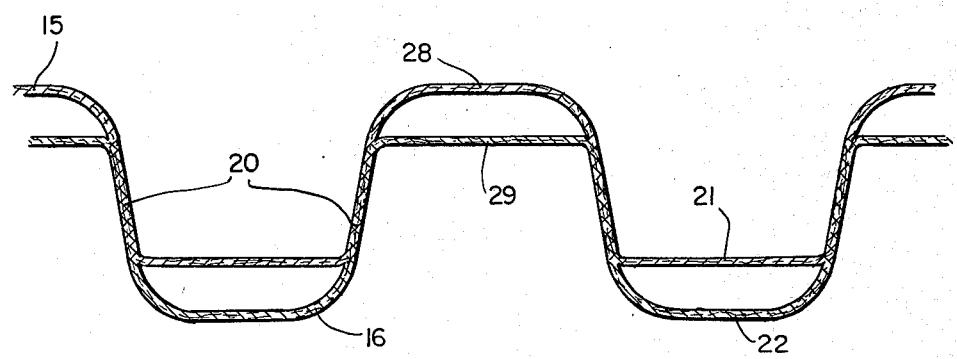
FIG. 2 is an enlarged sectional elevation view taken from FIG. 1 showing the preferred form of the product of the invention.

The two-ply sheet material 19 is the product of the invention and is more clearly illustrated in FIG. 2 where the first web 15 displays on its inner surface crests 21 and depressions 28, and the second web 16 also displays on its inner surface crests 29 and depressions 22. The two webs 15 and 16 are connected to each other at locations 20 intermediate the crests and depressions of both webs. The crests 21 of web 15 are spaced from the depressions 22 of web 16, and the crests 29 of web 16 are spaced from the depressions 28 of web 15. Thus, spaces are provided between the two webs 15 and 16 to increase absorptive capacity and product bulk, as well as softness due to compressibility.

The webs 15 and 16 are joined together by mechanical welding, which consists of pressing selected portions of the webs together and working those portions through movement of one knuckle against another with sufficient pressure to intermesh the fibers of one web with the fibers of the other webs so that the two webs are held together. The degree to which the two webs 15 and 16 are mechanically joined together is governed by the configuration of the embossing knuckles 17 and 18 and the amount of nip pressure between the two embossing rolls 11 and 12. By applying sufficient nip pressure, the webs 15 and 16 can be perforated by the intermeshing knuckles in addition to being joined together. Perforating the webs increases flexibility or softness of the web and also increases extensibility of the web, an advantage which is particularly useful when it is in the cross-machine direction of the web. U.S. Pat. No. Re 27,453, which is hereby incorporated by reference into the specification, discloses advantages of perforating the web in this manner.

The embossing knuckles 17 and 18 are more clearly illustrated in FIGS. 3 and 4. The interference of the embossing knuckles 17 and 18 with each other is clearly shown in FIG. 4 where the distal ends 25 of embossing knuckles 17 extend beyond distal ends 23 of embossing knuckles 18. The knuckles 17 and 18 are tapered outwardly (the sides converge in the outward direction) to permit contact with each other at their sides 27. The knuckles 17 and 18 illustrated in FIG. 4 each have an equally-sloped straight-line taper along their contact sides 27, causing mechanical welding of the two webs over relatively large areas of the locations 20 where the webs join together. However, the contact sides 27 of the knuckles 17 and 18 could be convexly curved if smaller areas of the locations 20 where the webs join together were desired. It is readily apparent that the depth to which distal ends 23 or 25 of embossing knuckles on one embossing roll extend beyond the distal ends 23 or 25 of embossing knuckles on the other embossing roll and thus the size of the spaces between webs 15 and 16 in product 19, can be regulated by the shape of each embossing knuckle 17 and 18. This depth is referred to as the degree of interference, with 100% meaning that the distal ends 23 and 25 contact the depressions 24 and 26 on the other embossing roll.

FIG. 3 illustrates knuckles 17 of upper embossing roll 11 overlapping in the machine direction (direction of roll rotation) knuckles 18 of lower embossing roll 12. The mechanical working of the webs 15 and 16 which causes welding of the webs to each other and creates perforations in the webs, if desired, is confined to the areas of overlap of the knuckles 17 and 18. Thus, the amount of overlap offers one control on the size of the perforations, with greater overlap producing longer perforations in the machine direction. By making the perforations longer in the machine direction than they are in the cross-machine direction, the product has a greater increase in stretch and flexibility in the cross-machine direction than in the machine direction. Still referring to FIG. 3, the knuckles 17 and 18 on both embossing rolls 11 and 12 are illustrated as being arranged in rows which are diagonally disposed with respect to the embossing roll axis. This arrangement has been found to produce the preferred product having diagonally disposed rows of crests, but the knuckles could also be arranged in axially aligned rows with good results.

Referring back to FIG. 2, the preferred form of product 19 is one of fibrous webs 15 and 16 which were formed by deposition of an aqueous slurry of lignocellulosic fibers, although webs of other natural and synthetic fibers, formed from aqueous slurries or dry formed, could be used. Each web 15 and 16 preferably has a basis weight of from about 10 to about 30 pounds per ream of 2,880 square feet. The preferred form of the product 19 is also one which has from about 70 to about 300 crests or embossed areas per square inch on each side of the product 19 and perforations in the webs at joining locations 20 which extend in the machine direction of the webs from about 0.010 inch to about 0.100 inch. The number of perforations is preferably from about 140 to about 600, there being one on each side of each crest. The preferred spacing of the crests 21 or 29 on one web from the depressions 22 or 28 on the other web is from about 10% to about 70% of the bulk thickness of the product 19. Producing this spacing requires knuckle interference of from about 30% to about 90%. The preferred finished sheet material will have a bulk thickness of from about 0.010 inch to about 0.050 inch.

To further illustrate a preferred form of the invention, the following example is given. Two paper webs were formed by conventional papermaking techniques from a pulp slurry of 50% bleached sulfate softwood and 50% bleached sulfate hardwood. The two webs were identical to each other and each had the following physical properties:

| | |
|---|---|
| Tensile Strength MD | 40.5oz./in. |
| Stretch MD | 22.1% |
| Tensile Strength CD | 21.5oz./in |
| Stretch CD | 4.6% |
| Bulk | .080in/24 sheets |
| Basis Weight | 14.4lbs/2880ft.$^2$ |
| Absorbency (1cc of H$_2$O) | 418 seconds |

The two webs were passed through the apparatus of the invention having the following specifications. The embossing rolls were made from hardened steel and had a diameter of 8 inches and embossing knuckles about the periphery at a concentration of 128 per square inch and of a size of .0325 inch × .090 inch, with the longer dimension extending circumferentially about the roll. The depth of each embossing knuckle from distal end to depression was .021 inches, and they were set to interfere with each other to a depth of .015 inches. The embossing knuckles tapered outwardly in a straight taper at equal slopes on both embossing rolls. The press rolls each had an overall diameter of 4.5 inches, including a ¼ inch thick rubber cover having a hardness of 45 durometer. The nip loading of each press roll with its embossing roll was set at 120 pounds per linear inch. The two webs were passed through the embossing rolls at a speed of 50 fpm. The physical properties of the finished two-ply web product were the following:

| | |
|---|---|
| Tensile Strength MD | 52.3oz./in. |
| Stretch MD | 11.8% |
| Tensile Strength CD | 16.0oz./in. |
| Stretch CD | 13.7% |
| Bulk | .429 in/24 sheets |
| Basis Weight | 26.5lbs/2880ft$^2$ |
| Absorbency (1cc H$_2$O) | 1.8 second |

The preferred forms of the invention have been described, but it should be recognized that variations may be practiced with many of the advantages of the preferred forms. One example is the use of knuckles which contact only one knuckle on the other embossing roll, joining the webs only on one side of the crests. Another example is the use of knuckles on one embossing roll which do not taper outwardly, joining the edge of the crests of one web to areas on the other web intermediate the crests and depressions. And another example is the use of an adhesive to replace or supplement the mechanical welding of the web. Also, one or more additional webs could be passed through the embossing rolls either along with the first or second webs through the nip formed by a press roll or by avoiding the press rolls.

What is claimed is:

1. A soft, absorbent, fibrous sheet material of papermaking fibers comprising:
   two webs joined together with inner surfaces facing each other, each web having a plurality of crests and depressions on its inner surface,
   the crests on each web being positioned between the crests on the other web and extending beyond the crests on the other web toward and spaced from the depressions on the other web, and
   the two webs being connected to each other at locations intermediate the crests and depressions on at least one of the webs.

2. Fibrous sheet material according to claim 1, wherein the two webs are connected to each other at locations intermediate the crests and depressions on both of the webs.

3. Fibrous sheet material according to claim 2, wherein each web is connected to the other web on two sides of each crest.

4. Fibrous sheet material according to claim 1, wherein the two webs are connected to each other by mechanically welding.

5. Fibrous sheet material according to claim 4, wherein the webs are perforated at the locations where they connect to each other.

6. Fibrous sheet material according to claim 5, wherein the perforations are elongated in the machine-direction of the webs and are from about 0.010 inch to about 0.100 inch long.

7. Fibrous sheet material according to claim 4, wherein the crests in each web are arranged in diagonally disposed rows, and the webs are perforated at the locations where they connect to each other.

8. Fibrous sheet material according to claim 4, wherein the webs are formed by deposition of an aqueous slurry of lignocellulosic fibers and each web has a dry basis weight of from about 10 to about 30 lbs/2,880/ft².

9. Fibrous sheet material according to claim 8, wherein the crests on each web are spaced from the depressions on the other web a distance from about 10% to about 70% of the bulk thickness of the sheet material formed by the two webs.

10. Fibrous sheet material according to claim 9, wherein each web has from about 70 to about 300 crests per square inch on its inner surface, and the bulk thickness of the sheet material is from about 0.010 inch to about 0.050 inch.

* * * * *